June 28, 1938. B. CLAYTON Re. 20,772
PROCESS FOR PRODUCING SOAP HAVING A DEFINITE WATER CONTENT
Original Filed June 16, 1934
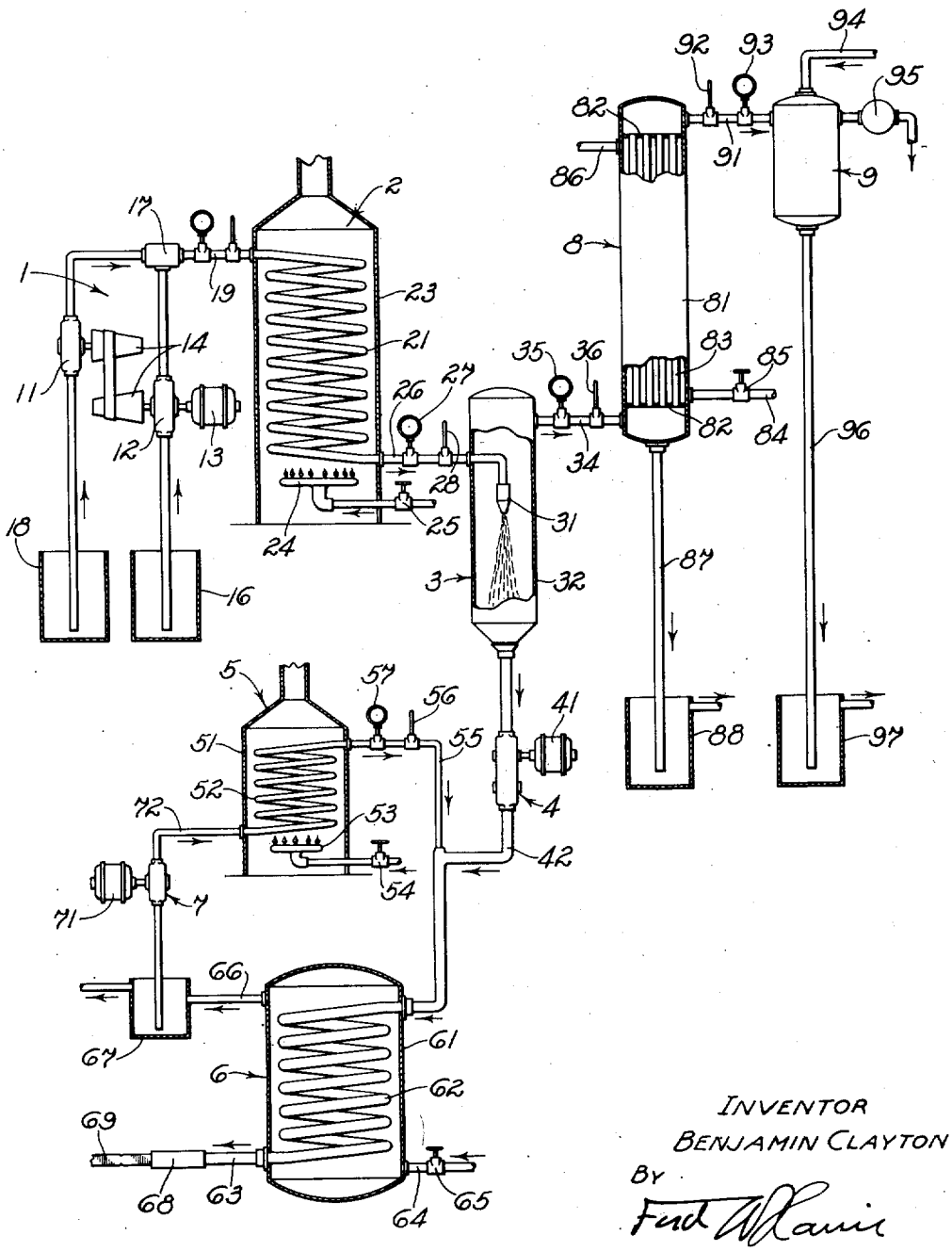
INVENTOR
BENJAMIN CLAYTON
BY
Fred W. Rami
ATTORNEY Reissued June 28, 1938

Re. 20,772

UNITED STATES PATENT OFFICE 20,772

PROCESS FOR PRODUCING SOAP HAVING A DEFINITE WATER CONTENT

Benjamin Clayton, Houston, Tex., assignor to Refining, Inc., Reno, Nev., a corporation of Nevada Original No. 2,037,006, dated April 14, 1936, Serial No. 730,971, June 16, 1934. Application for reissue June 16, 1937, Serial No. 148,612

18 Claims. (Cl. 87—16)

My invention relates to the manufacture of soap and an object of the invention is to provide a process of and apparatus by which soap may be produced directly in a continuous process from raw material.

A further object of the invention is to provide a process of and apparatus for producing soap continuously in which the soap is produced in solid form of any suitable shape.

A further object of the invention is to provide an apparatus for and process of producing soap in which the moisture content of the soap produced can be accurately regulated within any desired limits.

Further objects and advantages will be made evident hereinafter.

Referring to the drawing, which is purely diagrammatic, 1 is a mixing apparatus, 2 is a heater, 3 is a separating chamber, 4 is an extrusion pump, 5 is a boiler, 6 is a cooler and extruder, 7 is a water injection pump, 8 is a glycerine condenser, and 9 is a water condenser of the jet type.

The mixing apparatus consists of an alkali pump 11 and a fat pump 12, the pump 12 being driven by a suitable motor 13 and the pump 11 being driven through a speed changing gear 14 from the pump 12. The fat which it is desired to convert into soap is taken from a fat tank 16 and pumped into a mixer 17 by the pump 12. An alkali tank 18 contains an aqueous solution of a saponifying alkali such, for example, as caustic soda in water, the pump 11 taking the aqueous alkali solution or reagent from the tank 18 and pumping it into the mixer 17. The mixed fat and reagent pass through a pipe 19 to a coil 21 of the heater 2.

The heater 2 consists of an outer shell 23 in which a coil 21 is placed, and a burner 24 supplied with fuel through a fuel valve 25. Gas or oil may be used as fuel, this fuel being ignited at the burner and the hot products of combustion passing upwardly inside the shell 23 and supplying heat to the coil 21. In the coil 21 a reaction takes place between the reagent and the fat, soap, glycerine and water vapors, hereinafter termed the "reaction products", being delivered through a pipe 26, having a pressure gauge 27 and a thermometer 28 therein, to a nozzle 31 in the separating chamber 3.

The separating chamber 3 consists of a tight shell 32 inside which the nozzle 31 is carried. The nozzle consists of a metal member having a constricted orifice through which the reaction products must pass. The soap pump 4 is preferably a gear or screw pump capable of handling the hot soap precipitated in the chamber 32. This pump is driven by a motor 41 and delivers the hot soap to a pipe 42.

The boiler 5 may be of any convenient type, that shown consisting of a shell 51 in which is placed a pipe coil 52. The water in the pipe coil 52 is heated by the products of combustion from a burner 53 supplied with gas through a fuel valve 54. Steam is delivered from the boiler 5 through a pipe 55, having a thermometer 56 and a pressure gauge 57 therein, to the pipe 42.

While different forms of cooler 6 may be employed, it is desirable that one be used which tends to uniformly mix the steam delivered by the pipe 55 with soap delivered from the pipe 42 and the form shown is well adapted to accomplish this result. It consists of a tight shell 61 in which is placed a coil 62 into which the mixture of soap and steam is delivered by the pipe 42. The cooled soap leaves the coil 62 through a pipe 63. Cooling water is supplied to the cooler 6 through a pipe 64, the flow being controlled by a valve 65. Hot water is delivered from the cooler 6 through a pipe 66 to a tank 67. The cooled soap is delivered through the pipe 63 to an extrusion nozzle 68, which may have a single or several orifices of any desired shape, the soap being extruded in the form of threads or as a continuous bar 69. Devices may be incorporated in the extrusion nozzle 68 to break up the threads or bar into separate pieces of soap or the threads or bar 69 may be broken up after leaving the extrusion nozzle 68.

The water injection pump 7 may also be a screw or gear pump, being driven by a motor 71, the speed of which may be regulated to control the amount of water injected through a pipe 72 into the coil 52 of the boiler 5.

Any gas or vapor released in the separating chamber 3 is withdrawn through a pipe 34 having a pressure gauge 35 and a thermometer 36 therein. The pipe 34 communicates with the bottom of the glycerine condenser 8. The glycerine condenser 8 consists of a tight shell 81 having intermediate heads 82 between which tubes 83 extend. The space between the heads 82 inside the shell 81 and around the tubes 83 is filled with cooling water delivered through a pipe 84 having a valve 85, this cooling water being removed through a pipe 86.

Any condensate produced in the glycerine condenser 8 passes downwardly through a pipe 87 to a glycerine tank 88, the pipe 87 being about thirty feet long so that as long as the lower end of the pipe is submerged in the glycerine in the tank 88, it is possible to maintain a high degree of vacuum in the condenser 8.

Any gases or vapors which are not condensed in the glycerine condenser 8 pass through a pipe 91, having a thermometer 92 and a pressure gauge 93 therein, to the jet condenser 9. This jet condenser is supplied with cooling water from a pipe 94 and is provided with an air pump 95. Any water condensed in the jet condenser 9 is delivered through a pipe 96 to a water tank 97. The pipe 96 is about thirty feet long so that as long as the lower end is submerged in the water in the tank 97, a vacuum may be maintained in the condenser 9 if desired.

The method of operation is as follows:

The tank 16 is filled with the saponifiable fat which it is desired to convert into soap, this fat being warmed if necessary to a point at which it is liquid. The tank 18 is filled with an aqueous solution of a saponifying alkali, such, for example, as a solution of caustic soda in water. The fat is pumped into the mixer 17 by the pump 12 and the saponifying alkali is pumped into the mixer 17 by the pump 11. The variable speed gear 14 is adjusted so that the proportion of saponifying alkali supplied to the mixer 17 is only slightly in excess of that theoretically necessary to completely saponify the fat. The pumps 11 and 12 may be piston pumps but should be of such type that they can pump against several hundred pounds per square inch pressure. The mixture of saponifiable fat and saponfying alkali is delivered through the pipe 19 to the heater 2 and is heated therein by the products of combustion from the burner 24.

It will be understood that the aqueous solution of a saponifying alkali is dispersed in the saponifiable material due to mixing in the mixer 17 and is maintained in dispersion during the flow of the material through the coil 21 of the heater. The reagent or aqueous solution of a saponifying alkali is in the form of fine drops, the surfaces of which are in contact with the oil. This method of producing a reaction between the reagent and the saponifiable material by providing contact between the reagent and the oil is for convenience termed "contacting."

In the coil 21 a reaction takes place between the saponifying alkali and the saponifiable fat, and soap and glycerine are formed. Sufficient heat is supplied to the mixture in the coil 21 to raise the temperature of the reaction products passing through the pipe 26, as indicated on the thermometer 28.

The reaction products, that is to say, the soap and glycerine, with all of the water content of the mixture delivered to the coil 21, are ejected through the nozzle 31 into the separating chamber 3. The interior of the separating chamber 3 is maintained under vacuum and there is, of course, a high pressure drop as the reaction products pass through the constricted orifice of the nozzle 31.

These reaction products emerge from this constricted orifice in the form of a high velocity jet containing steam, glycerine vapor, and particles of liquid soap. The soap is thrown violently downward to the bottom of the chamber due to the velocity of the jet and in its passage through the chamber the glycerine vapor and steam escape therefrom, passing upwardly and being withdrawn through the pipe 34. Sufficient heat should be supplied by the burner 24 to enable the temperature as indicated by the thermometer 36 of the vapors passing to the glycerine condenser 8 to be maintained above the boiling point of glycerine at the absolute pressure indicated on the vacuum gauge 35.

The soap which is delivered to the bottom of the separating chamber 3 contains almost no water or glycerine. It is, however, at a sufficiently high temperature to be liquid and it is continuously withdrawn through the soap pump 4 and delivered to the pipe 42.

Since the soap delivered to the pump 4 is practically free from water, it is desirable to add water thereto to produce a commercial soap, since such soaps usually contain from 10% to 20% of water. This water content is added in the form of steam injected through the pipe 55 into the flowing stream of hot soap leaving the pump 4 through the pipe 42. The pump 4 should be capable of exerting considerable pressure since it not only takes soap from the chamber, which is under a vacuum, and extrudes it against atmospheric pressure, but it must also overcome some fluid friction in the cooler 6 and a very considerable friction in the extrusion nozzle 68. By regulating the rate of feed of the water pump 7 in proportion to the rate of feed of the fat pump 12, a soap of absolutely fixed and definite water content can be produced.

The mixture of steam and glycerine vapor passing through the pipe 34 into the glycerine condenser 8 is cooled in its upward passage through the tubes 83 to such a degree that substantially all of the glycerine content of these vapors is condensed, this glycerine condensate running downwardly through the pipe 87 to the tank 88. The steam, freed from the glycerine vapors, then passes through the pipe 91 to the water condenser 9. The supply of cooling water delivered to the glycerine condenser through the pipe 84 is so regulated that the temperature of the steam passing through the pipe 91, as indicated on the thermometer 92, is considerably below the boiling point of glycerine at the pressure indicated on the pressure gauge 93 and above the boiling point of water at that pressure.

In the jet condenser 9 the steam is condensed due to the introduction of cooling water through the pipe 94, the condensed water being delivered through the pipe 96 to the tank 97. Any air or uncondensed vapor or gas which would tend to accumulate in the jet condenser 9 is continuously withdrawn by the air pump 95.

In practice the degree of vacuum carried in the separating chamber 3 may be regulated by suitable manipulation of the condensers 8 and 9 and the air pump 95. The degree of vacuum maintained depends somewhat upon the temperature of the jet leaving the nozzle 31. The higher this temperature, the higher the absolute pressure can be carried in the separating chamber 3. This pressure must be sufficiently low to promote a rapid vaporization of the glycerine, this vaporization being promoted by the fact that the chamber also contains steam, thus reducing the partial pressure of the glycerine vapors due to the law of partial pressures.

In practice the apparatus operates continuously, the tanks 16 and 18 being replenished from time to time and the glycerine and water delivered to the tanks 97 and 88 being withdrawn as they accumulate. The soap 69 extruded from the pipe 61 has a definite and constant water content. The glycerine recovered, being a distillate, is in very pure form and has a high commercial value.

If desired, the temperature in the separating chamber 3 can be lowered sufficiently so that all or a portion of the glycerine is not vaporized and is carried over as a liquid in the soap removed by the pump 4. The same effect can, of course, be obtained by increasing the absolute pressure in the separating chamber. All that is necessary to permit the glycerine to be carried over into the soap with a substantial dehydration of the soap passing to the pump 4, is to hold the temperature in the separating chamber 3 above the boiling point of water at the pressure maintained therein, but below the boiling point of glycerine under that pressure.

I claim as my invention:

1. A continuous process of producing soap directly from a saponifiable material by the reaction therewith of an aqueous solution of a saponifying reagent, and recovering the glycerine produced by the process, which comprises: contacting the materials to produce soap and glycerine; continuously passing the mixture of soap and glycerine into an evaporating chamber; continuously removing water and glycerine vapor from said chamber at a rate sufficient to maintain a sufficient vacuum therein to vaporize substantially all the water and glycerine in said mixture; and continuously withdrawing soap from said chamber in such a manner as not to impair the vacuum maintained therein.

2. A continuous process of producing soap directly from a saponifiable material by the reaction therewith of an aqueous solution of a saponifying reagent, and recovering the glycerine produced by the process, which comprises: contacting the materials to produce soap and glycerine; continuously passing the mixture of soap and glycerine into an evaporating chamber; continuously removing water and glycerine vapor from said chamber at a rate sufficient to maintain a sufficient vacuum therein to vaporize substantially all the water and glycerine in said mixture; maintaining the soap at such a temperature after the glycerine and water vapor has been withdrawn therefrom that it is molten and sufficiently liquid to be pumped; and pumping said soap out of said chamber as the soap is formed therein without impairing the vacuum maintained in said chamber.

3. A continuous process of producing soap directly from a saponifiable material by the reaction therewith of an aqueous solution of a saponifying reagent, and recovering the glycerine produced by the process, which comprises: contacting the materials to produce soap and glycerine; continuously passing the mixture of soap and glycerine into an evaporating chamber; continuously removing water and glycerine vapor from said chamber at a rate sufficient to maintain a sufficient vacuum therein to vaporize substantially all the water and glycerine in said mixture; maintaining the soap at such a temperature after the glycerine and water vapor has been withdrawn therefrom that it is molten and sufficiently liquid to be pumped; pumping said soap out of said chamber as the soap is formed therein without impairing the vacuum maintained in said chamber; cooling said soap after it has been so pumped to a temperature at which it is plastic; and utilizing the pressure used for pumping the soap from said chamber to extrude the soap from a suitable orifice in the form of a solid bar.

4. A continuous process of producing soap directly from a saponifiable material by the reaction therewith of an aqueous solution of a saponifying reagent, and recovering the glycerine produced by the process, which comprises: contacting the materials to produce soap and glycerine; continuously passing the mixture of soap and glycerine into an evaporating chamber; continuously removing water and glycerine vapor from said chamber at a rate sufficient to maintain a sufficient vacuum therein to vaporize substantially all the water and glycerine in said mixture; continuously withdrawing soap from said chamber in such a manner as not to impair the vacuum maintained therein; and adding sufficient water to said soap after it has been withdrawn from said chamber to give it a definite water content.

5. A continuous process of producing soap directly from a saponifiable material by the reaction therewith of an aqueous solution of a saponifying reagent, and recovering the glycerine produced by the process, which comprises: contacting the materials to produce soap and glycerine; continuously passing the mixture of soap and glycerine into an evaporating chamber; continuously removing water and glycerine vapor from said chamber at a rate sufficient to maintain a sufficient vacuum therein to vaporize substantially all the water and glycerine in said mixture; maintaining the soap at such a temperature after the glycerine and water vapor has been withdrawn therefrom that it is molten and sufficiently liquid to be pumped; pumping said soap out of said chamber as the soap is formed therein without impairing the vacuum maintained in said chamber; and adding sufficient water to said soap after it has been withdrawn from said chamber to give it a definite water content.

6. A continuous process of producing soap directly from a saponifiable material by the reaction therewith of an aqueous solution of a saponifying reagent, and recovering the glycerine produced by the process, which comprises: contacting the materials to produce soap and glycerine; continuously passing the mixture of soap and glycerine into an evaporating chamber; continuously removing water and glycerine vapor from said chamber at a rate sufficient to maintain a sufficient vacuum therein to vaporize substantially all the water and glycerine in said mixture; maintaining the soap at such a temperature after the glycerine and water vapor has been withdrawn therefrom that it is molten and sufficiently liquid to be pumped; pumping said soap out of said chamber as the soap is formed therein without impairing the vacuum maintained in said chamber; cooling said soap after it has been so pumped to a temperature at which it is plastic; adding sufficient water to said soap after it has been withdrawn from said chamber to give it a definite water content; and utilizing the pressure used for pumping the soap from said chamber to extrude the soap from a suitable orifice in the form of a solid bar.

7. A process of producing soap directly from a saponifiable material by the reaction therewith of an aqueous solution of a saponifying reagent and recovering the glycerine produced by the process, which comprises; contacting the materials to produce soap and glycerine; continuously passing the mixture of soap and glycerine into an evaporating chamber; continuously removing water and glycerine vapor from said chamber at a rate sufficient to maintain a sufficient vacuum therein to vaporize substantially all the water and glycerine in said mixture; and continuously withdrawing soap from said chamber in such a manner as not to impair the vacuum maintained therein.

8. A process of producing soap directly from a saponifiable material by the reaction therewith of an aqueous solution of a saponifying reagent and recovering the glycerine produced by the process, which comprises: contacting the materials to produce soap and glycerine; continuously passing the mixture of soap and glycerine into an evaporating chamber; continuously removing water and glycerine vapor from said chamber at a rate sufficient to maintain a sufficient vacuum therein to vaporize substantially all the water and glycerine in said mixture; maintaining the soap in said chamber at such a temperature after the glycerine and water has been withdrawn that it is molten; and continuously withdrawing soap from said chamber in such a manner as not to impair the vacuum maintained therein.

9. A process of producing soap directly from a saponifiable material by the reaction therewith of an aqueous solution of a saponifying reagent, and recovering the glycerine produced by the process, which comprises: contacting the materials to produce soap and glycerine; continuously passing the mixture of soap and glycerine into an evaporating chamber; continuously removing water and glycerine vapor from said chamber at a rate sufficient to maintain a sufficient vacuum therein to separate as vapor substantially all the water and glycerine in said mixture; maintaining the soap at such a temperature after the glycerine and water vapor has been withdrawn therefrom that it is molten and sufficiently liquid to be pumped; and pumping said soap out of said chamber as the soap is formed therein without impairing the vacuum maintained in said chamber.

10. A process of producing soap and recovering glycerine therefrom, which comprises the steps of reacting a saponifiable material with a saponifying reagent to effect substantial saponification, thereafter passing the resultant saponified mixture, including soap and glycerine, into a vapor separating chamber and there promoting the separation of glycerine vapors from the soap by maintaining a temperature sufficiently high to cause the separated soap to be in a substantially liquid condition in said chamber, withdrawing the glycerine vapors from said vapor separating chamber at a rate sufficient to maintain a vacuum in said chamber, withdrawing the substantially liquid soap from said vapor separating chamber without substantially impairing the said vacuum maintained therein.

11. The process of producing soap and recovering glycerine which includes the steps of continuously withdrawing glycerine vapors from an evaporating chamber containing a mixture of soap and glycerine, at a rate sufficient to cause a reduced pressure to be maintained therein, promoting the separation of glycerine vapors from said soap by maintaining sufficient temperature in said evaporating chamber to cause the soap therein to be in a liquid condition when said vapors are separated from said soap, and withdrawing the liquid soap from said chamber without substantially impairing the reduced pressure maintained therein.

12. The process of producing soap and removing vaporizable impurities therefrom which comprises the steps of mixing saponifiable and saponifying materials, advancing the mixture, under pressure, to an evaporating chamber, heating the mixture to a temperature sufficient to vaporize said impurities when said pressure is reduced, discharging the heated mixture into the said evaporating chamber, continuously withdrawing vapors from said chamber at a rate sufficient to maintain a vacuum therein, maintaining the soap in a substantially liquid condition until removed from said chamber and removing said soap from said chamber substantially as soon as the same collects therein without substantially impairing the vacuum maintained in said chamber and during the concurrent introduction of the mixture to the evaporating chamber.

13. The process of producing soap and removing therefrom vaporizable impurities which comprises the steps of admixing saponifiable and saponifying materials to effect substantial saponification, introducing said mixture into an evaporating chamber, maintaining a temperature upon said mixture sufficient to vaporize the vaporizable constituents thereof and to maintain the soap in said chamber in a molten condition until removed, withdrawing the vaporized constituents at a rate sufficient to maintain a vacuum in said chamber, and withdrawing the molten soap from the chamber without breaking the vacuum maintained therein.

14. The process of producing soap and removing vaporizable impurities which includes the steps of continuously withdrawing the vaporizable impurities from an evaporating chamber containing a mixture of soap and vaporizable impurities, at a rate sufficient to cause a reduced pressure to be maintained therein, and continuously withdrawing the soap from said chamber without substantially impairing the reduced pressure maintained therein.

15. The process of producing soap and removing vaporizable impurities therefrom which comprises the steps of pumping under pressure a stream of previously saponified soap and said impurities to a vapor separating chamber, heating the stream during its advancement to an extent sufficiently high to vaporize said impurities during the advancement of said stream, introducing the thus heated stream to an evaporating chamber maintained under a vacuum whereby said impurities are separated as vapors from said soap, continuously withdrawing the soap while the stream is being continuously introduced to the vapor separating chamber.

16. The process as defined in claim 15 in which the impurities are separated as vapors with the aid of steam functioning to reduce the partial pressure of said vapors.

17. A continuous process for producing soap and recovering glycerine which comprises the steps of pumping together saponifiable and saponifying materials, advancing the resultant mixture as a stream through a reaction zone to effect substantial saponification and the formation of glycerine, supplying sufficient heat to the mixture as it is continuously advanced through said reaction zone to vaporize at least a portion of said glycerine, continuously introducing the mixture of soap and glycerine thus produced into an evaporating chamber, continuously withdrawing the glycerine vapor from said chamber at a rate sufficient to maintain a partial vacuum therein, maintaining the soap at such a temperature after the glycerine has been removed therefrom that it is in a substantially molten condition, continuously withdrawing the said molten soap in its anhydrous and substantially glycerine free state from the evaporating chamber without substantially impairing the partial vacuum therein maintained and continuously subjecting the soap after withdrawal from the evaporating chamber to a cooling step before exposure to the atmosphere.

18. A process of producing soap and recovering vaporizable materials resulting from the saponification of saponifiable and saponifying materials which comprises the steps of reacting a saponifiable material with a saponifying reagent to effect substantial saponification, thereafter passing the resultant saponified mixture including soap and the said vaporizable materials through a heating zone, supplying sufficient heat to said materials in said zone to cause substantially complete vaporization of said vaporizable materials when said mixture is introduced into a vapor separating chamber, introducing the mixture to said chamber, continuously withdrawing said vapors from said chamber at a rate sufficient to maintain a vacuum in said chamber and withdrawing the soap from the vapor separating chamber without substantially impairing the said vacuum maintained therein.

BENJAMIN CLAYTON.